May 23, 1961  F. O. WIENERT  2,985,507
METHOD OF PURIFYING METAL HALIDES
Filed Dec. 23, 1957
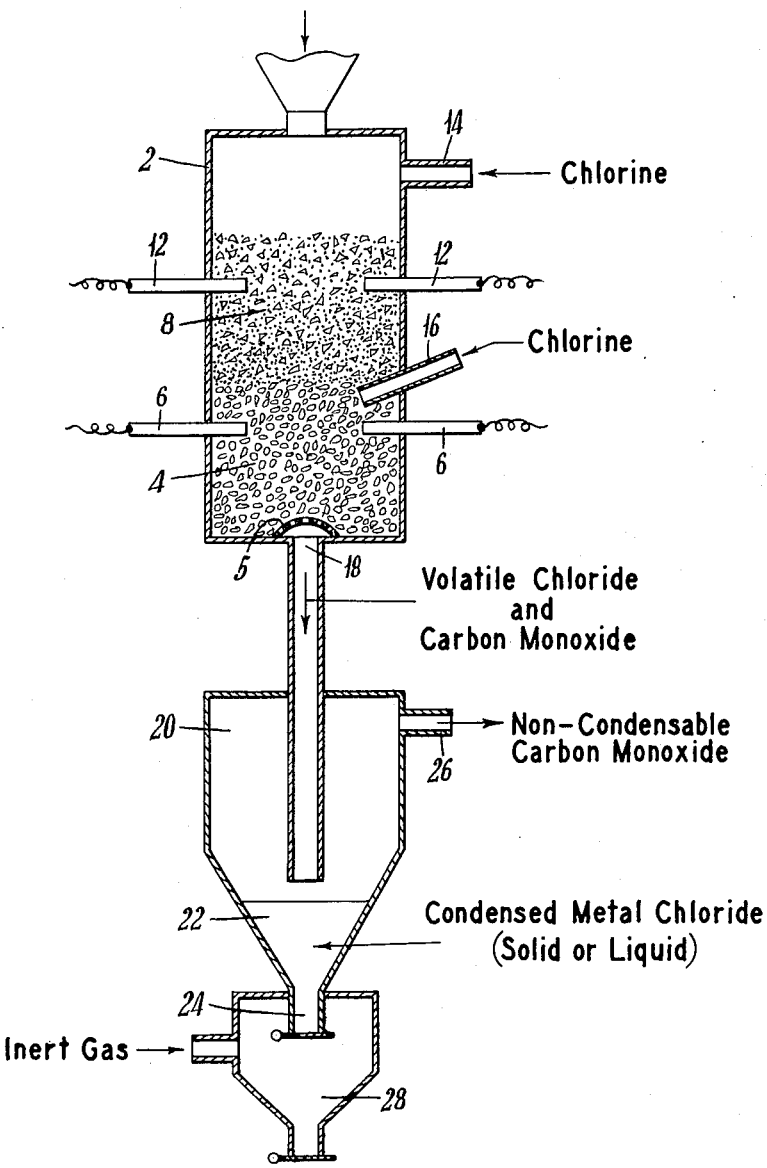
INVENTOR
FRITZ O. WIENERT
BY
ATTORNEY

United States Patent Office 2,985,507
Patented May 23, 1961

2,985,507

METHOD OF PURIFYING METAL HALIDES

Fritz O. Wienert, Niagara Falls, N.Y., assignor to Union Carbide Corporation, a corporation of New York Filed Dec. 23, 1957, Ser. No. 704,456

12 Claims. (Cl. 23—87)

This invention pertains to a novel method of producing volatile metal halides. The invention more specifically relates to an improved process whereby the metal halides produced are purified to a greater degree than has been possible using prior procedures.

The techniques involved in the halogenation of ores, for example, the chlorination of reactive metal ores, are constantly being refined due to the several important advantages which result from this practice. The chlorides of many metals volatilize at low temperatures and the once intimately combined constituents of the ore may be selectively separated with comparative ease by fractional distillation. This is particularly true of those high melting point reactive metals of Groups IV, V and VI of the Mendeléeff Periodic Table comprising titanium, vanadium, chromium, zirconium, columbium, molybdenum, hafnium, tantalum and tungsten.

While oxidic ores are sometimes completely converted to carbides or carbonitrides prior to chlorination, it is usually considered more economical to chlorinate partially carburized materials or mixtures of metal oxides and carbon. It is extremely important that the condensed metal chloride be as pure as possible. When an oxide-containing carbide or an oxide-carbon mixture is treated with chlorine at elevated temperatures, very fine-particled metal oxides or oxychlorides are invariably entrained in the metal halide vapor withdrawn to the condensing units. When the chloride is the starting material for producing the pure metal, either by electrolytic means or by direct reduction, the presence of oxides, even in minor quantities, often transfers a detrimental amount of oxygen to the final product. No known process is available for adequately and efficiently preventing the entrainment of oxygen-containing fines in the volatile gases produced during fluidized or stationary bed chlorinating processes.

Accordingly, a prime object of the present invention is to materially reduce the amount of oxygen-containing fines normally present in volatile metal halides, thereby providing a purer condensed product.

Other aims and advantages of the invention will be apparent from the following disclosure and appended claims.

According to the present invention these objects are achieved by mixing the halide vapors and entrained particles evolved in the chlorination of metal ores with free chlorine, passing the vapors and particles through a reactive carbon bed heated to normal chlorination temperature to trap solid oxidic and carbonaceous particles and provide carbon as an acceptor for the oxygen liberated from the entrapped material by the chlorine. This conversion may be exemplified in a simplified manner by the equation dealing with the reduction and chlorination of titanium:

$$TiO_2 + 2C + 2Cl_2 = TiCl_4 + 2CO$$

Also apparent from the above equation is the fact that the filtering action of the carbon will not be impaired by entrapped oxides since, by the reaction of the oxide with the chlorine and the carbon, the filter bed becomes self-cleaning. Eventually, by continuous reaction over a period of time, the carbon will diminish to the point where an insufficient amount necessary to be effective as a filter remains, at which time additional carbon may be added. When the charge consists of a metal carbide or a mixture of carbide and oxide, however, fine-particled carbon is also liberated when the metal chloride is formed and is carried over by the exhaust gases of the chlorinator. This material is similarly trapped by the filter and supplements the carbon bed, thereby reducing the number of times renewal of the filter bed is necessary.

The invention may be practiced in most conventional chlorinating apparatus or the volatile chloride and hot exhaust gases of an unadaptable chlorinator may be led to a separate chamber which is filled with a bed of reactive carbon, such as charcoal or petroleum coke. Free chlorine may be admitted to the separate chamber through a connecting pipe or it may be added to the gas as it enters the filter bed. In any modification, however, it is important that the carbon be heated above the temperature required to reduce the fine oxide particles. This is preferentially accomplished by conducting an electric current through the carbon bed so that the heat losses through the wall of the chamber are balanced. In addition, the temperatures of the exhaust gases are thereby increased to accelerate the reaction illustrated in the above equation.

The above and other objects and the novel features of the invention will become apparent from the following description of a preferred embodiment of the invention taken in conjunction with the attached schematic drawing. The drawing and description are of a modification wherein the chlorination and filtration are carried out in a single unit. It is to be understood, of course, that separate units could be employed.

In the drawing, a cylindrical shaft chlorinating chamber 2 is shown, the lower portion of which is charged with reactive carbon 4, such as charcoal supported by and resting upon a grill 5, which prevents the bed from dropping through opening 18 and into chamber 20. The charcoal may be electrically heated by electrodes 6. The charge 8, consisting of a mixture of metal oxide and carbon, or partially carburized ore, rests on top of the heated charcoal 4 and may similarly be heated by electrodes 12. Chlorine, introduced at the top 14, moves downward through the charge 8 to produce a gas mixture comprising volatile chloride and carbon monoxide. These gases and entrapped metal oxide fines progressively move downward to the charcoal bed 4, where fresh chlorine is admitted at approximately the interface between the two materials 16. The chlorine reacts with the metal oxide to form metal chlorides and to release free oxygen. The freed oxygen then combines with the hot carbon to form oxides of carbon. The mixed gases and vapors leave the chlorinating chamber through an opening 18 at the bottom of the chamber 2 and enter the condensing chamber 20. The condensed metal chloride 22 collects at the bottom in solid or liquid form and may be eventually discharged into cooling chamber 28 under protective inert gas through an opening 24 at the bottom, while the non-condensable carbon monoxide leaves the condenser through another opening 26 in the upper portion of the condenser. The downward flow of the gases throughout the system may be abetted by a suction device for the elimination of the oxides of carbon through the same vent 26.

As is evident from the above description, the method of the invention is most amenable to downdraft chlorination, as opposed to the more frequently employed updraft chlorinating procedures. It is understood, however, that no such limitation be attached to the method of the invention. Passing the volatile chlorides and gaseous products through a carbonaceous filter bed will purify in updraft chlorinating processes as well as in downdraft chlorinating processes. This modification is especially suitable in fluidized bed systems, where the volatiles containing the fines may be led to a separate chamber for purification through a hot carbon filter bed.

The practicability of the method comprising the invention was experimentally illustrated when a mixture of $ZrO_2$ pellets and carbon was placed over a charcoal charge and chlorine was introduced from above to pass through the charge. Zirconium tetrachloride vapors and oxides of carbon were produced which continued downward through the heated charcoal filter bed. Fresh chlorine was admitted to the charge at the boundary between the $ZrO_2$ charge and charcoal bed. The condensed zirconium tetrachloride powder collected in the condenser cone was discharged and, upon analysis, showed the product to contain only 1.66 percent $ZrO_2$.

In another run using the same furnace, the chlorine was introduced at the bottom in the conventional manner through a charge of $ZrO_2$ pellets and carbon. In this experiment the gases were withdrawn at the top to simulate normal updraft chlorinating procedures. No filter bed was employed. The condensed zirconium tetrachloride in this experiment analyzed 4.76 percent $ZrO_2$.

Since the reactions involved are endothermic the reactor is operated in each case at the highest practical temperature. The useable temperatures for the halogenation of various operable materials is limited only by chemical attack of the reactor lining.

The results of the preceding experiments serve to conclusively demonstrate the great reduction in final oxygen content achieved by using the method of the invention in conjunction with the chlorination of metal ores. The condensed chloride produced thereby is freed from oxygen and carbon and hence capable of producing purer end products.

While the preceding disclosure has been limited to a self-cleaning filter bed for use during the chlorination of reactive metal ores, it is understood that the invention is not to be so limited but is equally applicable to the filtration of the vapor of any reactive metal halide as, for instance, titanium bromide.

What is claimed is:

1. A process for the purification of contaminated vapors of a volatile halide of a metal selected from the group consisting of titanium, vanadium, chromium, zirconium, columbium, molybdenum, hafnium, tantalum, and tungsten wherein the contaminant comprises entrained solid oxide particles of said selected metal, which process comprises treating said contaminated vapors with a gaseous free halogen of the said volatile halide and passing said volatile halide and said free halogen through a filter bed consisting essentially of a solid carbonaceous reducing material under operating conditions whereby at least a substantial portion of said entrained solid oxide particles are trapped in said filter bed; and maintaining said filter bed at a temperature sufficient to effect chemical reaction between the said entrained solid oxide particles, and said carbonaceous filter bed, and said free halogen, whereby said entrained oxide is converted to a gaseous halide of said selected metal and a gaseous oxide of carbon, to render the filter bed self-cleaning.

2. A process in accordance with claim 1 wherein said contaminated vapors and said gaseous free halogen are passed through said filter bed concurrently.

3. A process in accordance with claim 1 wherein said volatile halide of said selected metal is a chloride.

4. A process in accordance with claim 1 wherein said contaminated vapors and said gaseous free halogen are passed through said filter bed concurrently and wherein said volatile halide of said selected metal is a chloride.

5. A process for the purification of contaminated vapors of a volatile halide of titanium wherein the contaminant comprises entrained solid particles of titanium oxide which process comprises treating said contaminated vapors with a gaseous free halogen of the said volatile halide and passing said volatile halide and said free halogen through a filter bed consisting essentially of a solid carbonaceous reducing material under operating conditions whereby at least a substantial portion of said entrained solid oxide particles are trapped in said filter bed; and maintaining said filter bed at a temperature sufficient to effect chemical reaction between the said entrained solid oxide particles, and said carbonaceous filter bed, and said free halogen, whereby said entrained oxide is converted to a gaseous halide of said titanium and a gaseous oxide of carbon, to render the filter bed self-cleaning.

6. A process in accordance with claim 5 wherein said contaminated vapors and said gaseous free halogen are passed through said filter bed concurrently.

7. A process in accordance with claim 5 wherein said volatile halide of said titanium is a chloride of titanium.

8. A process in accordance with claim 5 wherein said contaminated vapors are chlorides of titanium and said gaseous free halogen is chlorine and the same are passed through said filter bed concurrently.

9. A process for the purification of contaminated vapors of a volatile halide of zirconium wherein the contaminant comprises entrained solid particles of zirconium oxide, which process comprises treating said contaminated vapors with a gaseous free halogen of the said volatile halide and passing said volatile halide and said free halogen through a filter bed consisting essentially of a solid carbonaceous reducing material under operating conditions whereby at least a substantial portion of said entrained solid oxide particles are trapped in said filter bed; and maintaining said filter bed at a temperature sufficient to effect chemical reaction between the said entrained solid oxide particles, and said carbonaceous filter bed, and said free halogen, whereby said entrained oxide is converted to a gaseous halide of said zirconium and a gaseous oxide of carbon, to render the filter bed self-cleaning.

10. A process in accordance with claim 9 wherein said contaminated vapors and said gaseous halogen are passed through said filter bed concurrently.

11. A process in accordance with claim 9 wherein said volatile halide of said zirconium is a chloride of zirconium.

12. A process in accordance with claim 9 wherein said contaminated vapors are chlorides of zirconium and said gaseous free halogen is chlorine and the same are passed through said filter bed concurrently.

References Cited in the file of this patent

UNITED STATES PATENTS

| | | |
|---|---|---|
| 1,888,996 | McInerny et al. | Nov. 29, 1932 |
| 2,253,471 | Muskat et al. | Aug. 19, 1941 |
| 2,378,675 | Agnew et al. | June 19, 1945 |
| 2,555,374 | Rowe et al. | June 5, 1951 |
| 2,701,179 | McKinney | Feb. 1, 1955 |